US007715279B2

(12) United States Patent
Urano et al.

(10) Patent No.: US 7,715,279 B2
(45) Date of Patent: May 11, 2010

(54) TIME CORRECTION DEVICE, TIMEPIECE HAVING A TIME CORRECTION DEVICE, AND TIME CORRECTION METHOD

(75) Inventors: Osamu Urano, Nagano-ken (JP);
Teruhiko Fujisawa, Nagano-ken (JP);
Katsuyuki Honda, Nagano-ken (JP);
Jun Matsuzaki, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/777,889

(22) Filed: Jul. 13, 2007

(65) Prior Publication Data
US 2008/0025156 A1 Jan. 31, 2008

(30) Foreign Application Priority Data
Jul. 31, 2006 (JP) ............................. 2006-208593

(51) Int. Cl.
G04C 11/02 (2006.01)
H04B 7/185 (2006.01)
(52) U.S. Cl. ..................................... 368/47; 342/357.06
(58) Field of Classification Search .................. 368/47, 368/10, 46; 342/356, 357.06, 357.07; 455/12.1, 455/13.1–13.4
See application file for complete search history.

(56) References Cited
U.S. PATENT DOCUMENTS

| 4,287,597 | A |   | 9/1981 | Paynter et al. |
| 4,823,328 | A |   | 4/1989 | Conklin et al. |
| 5,408,444 | A |   | 4/1995 | Kita et al. |
| 5,650,785 | A | * | 7/1997 | Rodal .................... 342/357.12 |
| 5,771,001 | A |   | 6/1998 | Cobb |
| 5,860,056 | A |   | 1/1999 | Pond |
| 6,212,133 | B1 | * | 4/2001 | McCoy et al. .................. 368/9 |
| 6,381,701 | B1 | * | 4/2002 | Takai ........................ 713/400 |
| 6,686,877 | B2 | * | 2/2004 | Ishigaki et al. ......... 342/357.12 |
| 2005/0275587 | A1 |   | 12/2005 | Siegel et al. |

(Continued)

FOREIGN PATENT DOCUMENTS
DE 4202435 A1 8/1993

(Continued)

OTHER PUBLICATIONS
Lewandowski, W., et al., "GPS Time Transfer," Proceedings of the IEEE, New York, US, vol. 79, No. 7, Jul. 1, 1991, pp. 991-1000.

Primary Examiner—Vit W Miska
Assistant Examiner—Sean Kayes

(57) ABSTRACT

A time correction device has a reception unit that receives satellite signals transmitted from positioning information satellites orbiting the Earth; a time correction information storage unit that stores time correction information for correcting time information produced by a time information generating unit; and a time information correction unit for correcting the time information based on the time correction information. The satellite signals are transmitted by individual positioning information satellites, and contain a time-related information part denoting time-related information that is kept by each satellite, and a satellite information part denoting satellite information other than the time-related information. The time correction information is generated based on the time-related information. The reception unit receives the satellite signal during the signal period in which the time-related information part can be received, and does not receive the satellite signal during the signal period in which the satellite information part can be received.

3 Claims, 13 Drawing Sheets

U.S. PATENT DOCUMENTS

| | | |
|---|---|---|
| 2006/0071852 A1 | 4/2006 | Akano |
| 2006/0208942 A1 | 9/2006 | Vyas et al. |
| 2007/0041704 A1* | 2/2007 | Bando .......................... 386/66 |

FOREIGN PATENT DOCUMENTS

| | | |
|---|---|---|
| DE | 19821320 A1 | 12/1998 |
| EP | 1014235 A2 | 6/2000 |
| FR | 2863814 | 6/2005 |
| JP | 1010251 | 1/1998 |
| JP | 1082875 | 3/1998 |
| JP | 11237462 | 8/1999 |
| JP | 2001059864 | 3/2001 |
| WO | 9527927 A1 | 10/1995 |

* cited by examiner

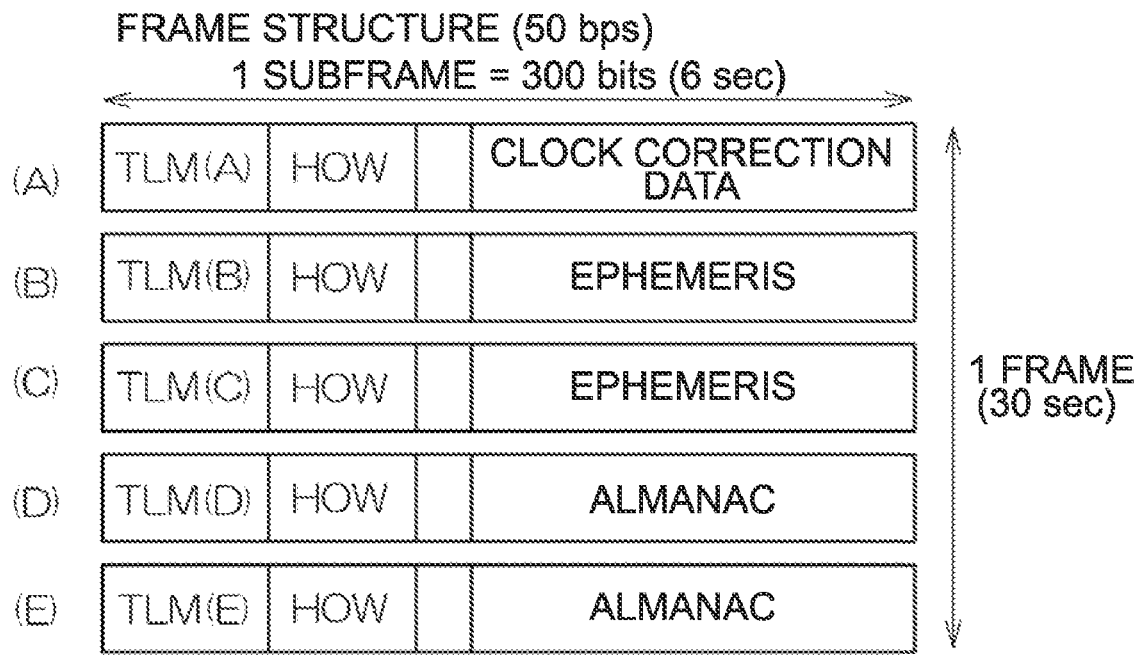
FIG.10A
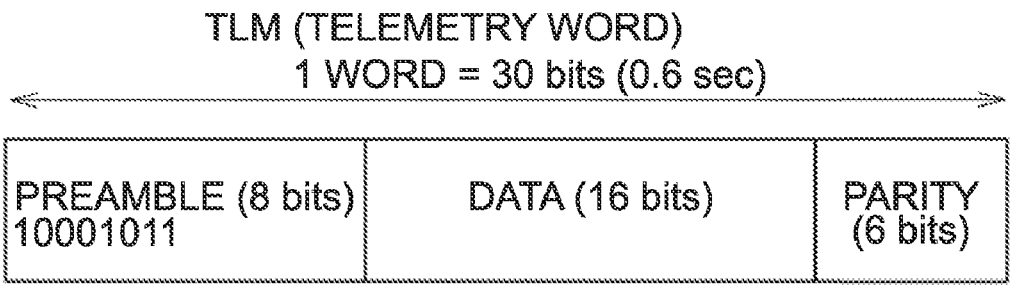
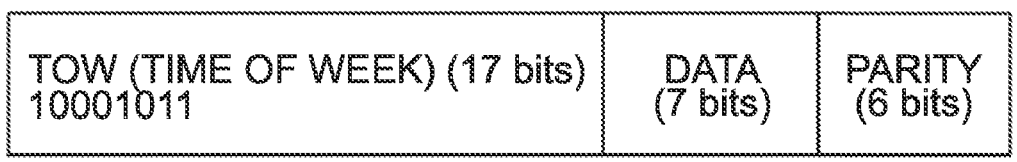
FIG.10B

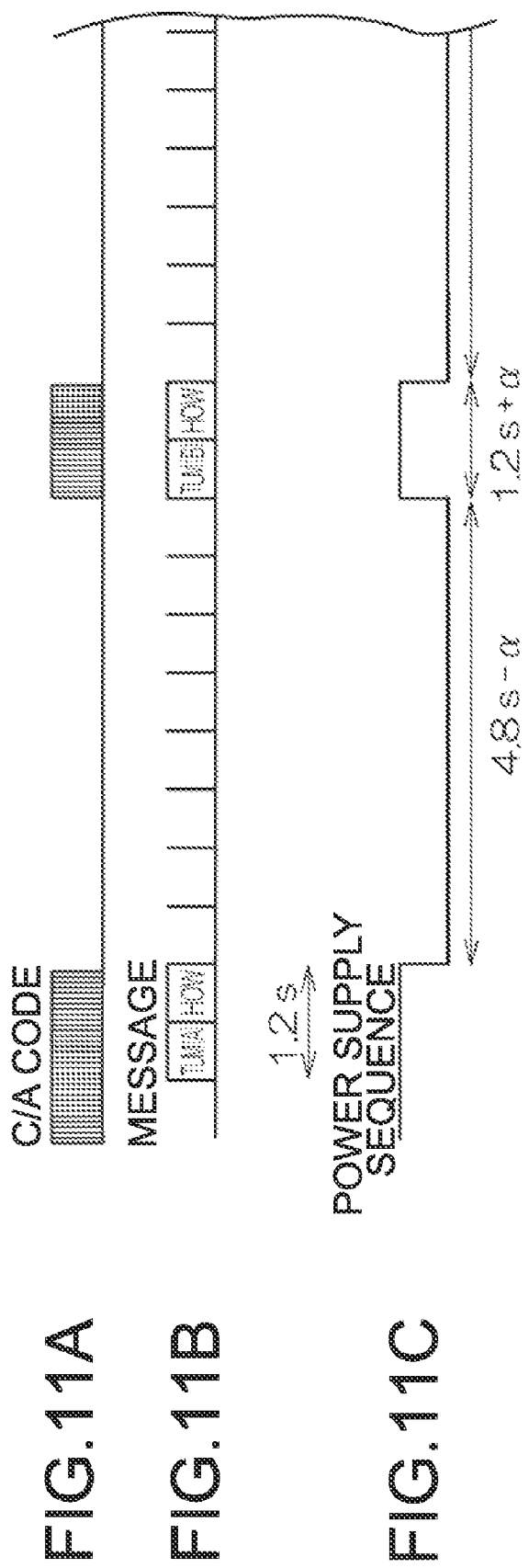

TIME CORRECTION DEVICE, TIMEPIECE HAVING A TIME CORRECTION DEVICE, AND TIME CORRECTION METHOD

CROSS-REFERENCE TO RELATED APPLICATIONS

Japanese Patent application No. 2006-208593 is hereby incorporated by reference in its entirety.

BACKGROUND

1. Field of Invention

The present invention relates to a time correction device for setting the time based on a signal from a positioning satellite such as a GPS satellite, to a timepiece having the time correction device, and to a method of correcting the time.

2. Description of the Related Art

The Global Position System (GPS), which is a system enabling a receiving device to determine its own position, uses satellites (GPS satellites) that each orbit the Earth on a specific path and have an on-board atomic clock. Each GPS satellite therefore keeps time (GPS time) with extremely high precision.

In order for a receiver (GPS receiver) that receives a signal from a GPS satellite to get the time information transmitted from the GPS satellite, and more particularly to get time information that is precise to at least 1 ms, the GPS receiver must usually receive the TOW (Time of Week) signal transmitted by the GPS receiver. The TOW signal denotes the number of seconds form the beginning of the week, and is reset every week.

The TOW signal is carried in each subframe of the GPS signal. The subframe signal must therefore be received in order to get the TOW signal, and it takes 6 seconds to receive one subframe.

Japanese Patent No. 3512068 (JP2001-59864) (see FIG. 5) teaches a method of synchronizing the receiver with the GPS satellite time without receiving the TOW signal.

The method taught in Japanese Patent No. 3512068 is a method of synchronizing to the time information required for positioning, and the TOW data is not needed for the time synchronization that is required for positioning.

However, if the GPS time transmitted from the GPS satellites is to be used to set the time of a timepiece, the TOW data must be received and receiving the TOW signal requires the six seconds needed to receive a subframe. Furthermore, the TOW data should be received twice in order to ensure that the TOW data was correctly received, and receiving the TOW data twice requires 12 seconds.

The receiver power must remain on during TOW signal reception, and this increases power consumption. Incorporating a receiver with such high power consumption in a timepiece or similar device with extremely low power requirements is thus impractical, and such a receiver therefore cannot be used to set the time with high precision in a timepiece such as a wristwatch or other similarly small electronic device.

SUMMARY

To solve these problems, a time correction device, a timepiece device having the time correction device, and a time correction method according to the present invention enable setting the time with high precision without high power consumption even when very little power is required.

A first aspect of the invention is a time correction device having a reception unit that receives satellite signals transmitted from positioning information satellites orbiting the Earth; a time correction information storage unit that stores time correction information for correcting time information produced by a time information generating unit; and a time information correction unit for correcting the time information based on the time correction information. The satellite signals are transmitted by individual positioning information satellites, and contain a time-related information part denoting time-related information that is kept by each satellite, and a satellite information part denoting satellite information other than the time-related information; the time correction information is generated based on the time-related information; and the reception unit receives the satellite signal during the signal period in which the time-related information part can be received, and does not receive the satellite signal during the signal period in which the satellite information part can be received.

In this aspect of the invention the reception unit receives the satellite signal during the signal period in which the time-related information part can be received, and does not receive the satellite signal during the signal period in which the satellite information part can be received.

Because the reception unit is not driven to receive the satellite signal while the satellite information part can be received, power consumption from the power supply unit is reduced and power consumption is therefore not great.

This aspect of the invention gets the time-related information of the positioning information satellite, generates time correction information based on this time-related information, and corrects the time information generating unit according to this time correction information. The time of the time information generating unit can therefore be corrected highly precisely.

More specifically, this aspect of the invention affords a time correction device that can precisely correct the time without high power consumption.

Preferably, the time correction device also has transmission delay time information denoting the time until the satellite signal transmitted from the positioning information satellite can be received, and generates the time correction information based on the time-related information and the transmission delay time information.

This aspect of the invention has transmission delay time information denoting the time until the satellite signal transmitted from the positioning information satellite can be received, and generates the time correction information based on the time-related information and the transmission delay time information.

By considering the transmission delay time, the time correction information is very precise.

Preferably, the time correction device also has an almanac data storage unit that stores orbital information about the positioning information satellites; and an almanac-referenced transmission delay time generating unit for determining an almanac-referenced transmission delay time based on the almanac data.

Because the time correction device also has an almanac-referenced transmission delay time generating unit for determining an almanac-referenced transmission delay time based on the almanac data, the transmission delay time can be determined more accurately and the time correction information reflecting the transmission delay time is more precise.

Preferably, the reception unit of the time correction device receives the satellite signal from a single positioning information satellite and generates the time correction information.

Because the reception unit receives the satellite signal from a single positioning information satellite and generates the time correction information, the time can be corrected precisely using significantly less power than when satellite signals are received from a plurality of positioning information satellites.

Further preferably, the time correction device also has single positioning-information-satellite-referenced time correction information used by the reception unit to generate the time correction information based on the satellite signal from a single positioning information satellite; and plural positioning-information-satellite-referenced time information used by the reception unit for positioning and to generate the time correction information based on satellite signals from a plurality of positioning information satellites. The reception unit has selection information for selecting the single positioning-information-satellite-referenced time correction information or the plural positioning-information-satellite-referenced time information based on capturability information denoting whether a satellite signal from the positioning information satellites can be captured, and a time correction selection and execution unit for selecting the single positioning-information-satellite-referenced time correction information or plural positioning-information-satellite-referenced time information based on the selection information and correcting the time based on the selected time information.

This aspect of the invention also has single positioning-information-satellite-referenced time correction information used by the reception unit to generate the time correction information based on the satellite signal from a single positioning information satellite, plural positioning-information-satellite-referenced time information used by the reception unit for positioning and to generate the time correction information based on satellite signals from a plurality of positioning information satellites, and selection information for selecting the single positioning-information-satellite-referenced time correction information or the plural positioning-information-satellite-referenced time information based on capturability information denoting whether a satellite signal from the positioning information satellites can be captured.

If the reception unit cannot capture a positioning information satellite and cannot generate the time correction information from only one positioning information satellite, the plural positioning-information-satellite-referenced time information is used for positioning to capture positioning information satellites and generate the time correction information.

Furthermore, if the reception unit can capture a signal from one positioning information satellite, the plural positioning-information-satellite-referenced time information is not used and the single positioning-information-satellite-referenced time correction information is used to correct the time and reduce power consumption.

Another aspect of the invention is a timepiece with a time correction device that has a reception unit that receives satellite signals transmitted from positioning information satellites orbiting the Earth; a time information generating unit that generates time information; a time correction information storage unit that stores time correction information for correcting the time information of the time information generating unit; and a time information correction unit for correcting the time information based on the time correction information. The satellite signals are transmitted by individual positioning information satellites, and contain a time-related information part denoting time-related information that is kept by each satellite, and a satellite information part denoting satellite information other than the time-related information; the time correction information is generated based on the time-related information; and the reception unit receives the satellite signal during the signal period in which the time-related information part can be received, and a power supply unit does not supply power for signal reception by the reception unit during the signal period in which the satellite information part can be received.

Another aspect of the invention is a time correction method having a reception unit that receives satellite signals transmitted from positioning information satellites orbiting the Earth; a time correction information storage unit that stores time correction information for correcting time information produced by a time information generating unit; and a time information correction unit for correcting the time information based on the time correction information. The satellite signals are transmitted by individual positioning information satellites, and contain a time-related information part denoting time-related information that is kept by each satellite, and a satellite information part denoting satellite information other than the time-related information; the time correction information is generated based on the time-related information; and the reception unit receives the satellite signal during the signal period in which the time-related information part can be received, and does not receive the satellite signal during the signal period in which the satellite information part can be received.

Other objects and attainments together with a fuller understanding of the invention will become apparent and appreciated by referring to the following description and claims taken in conjunction with the accompanying drawings.

BRIEF DESCRIPTION OF THE DRAWINGS

FIGS. 10A and 10B illustrate the structure of the GPS satellite signal.

FIG. 11 describes the operation of step ST74.

DESCRIPTION OF THE PREFERRED EMBODIMENTS

Preferred embodiments of the present invention are described below with reference to the accompanying figures.

The embodiments described below are specific desirable examples of the invention and technically desirable limitations are also noted, but the scope of the invention is not limited to these embodiments except as may be specifically described below.

Figure 1:
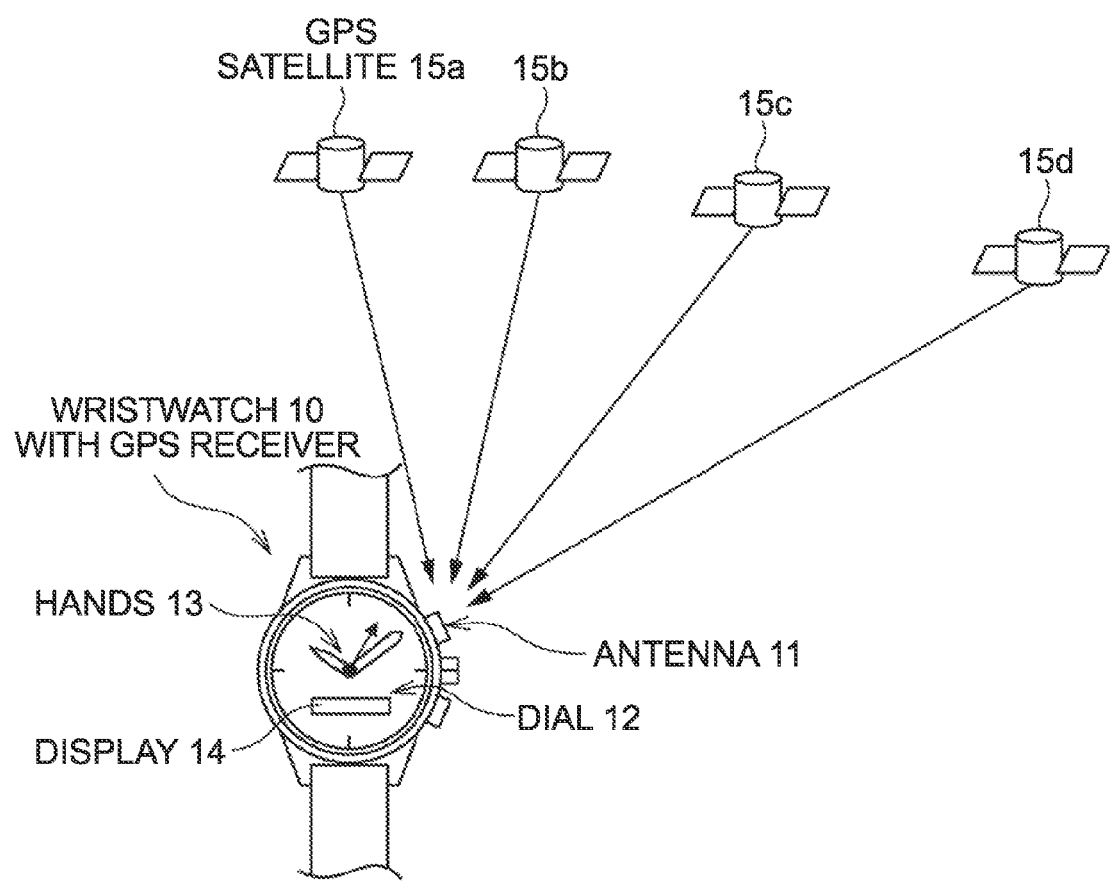
FIG. 1 shows a wristwatch with a GPS time correction device as an example of a timepiece having a time correction device according to the present invention.
Figure 2:
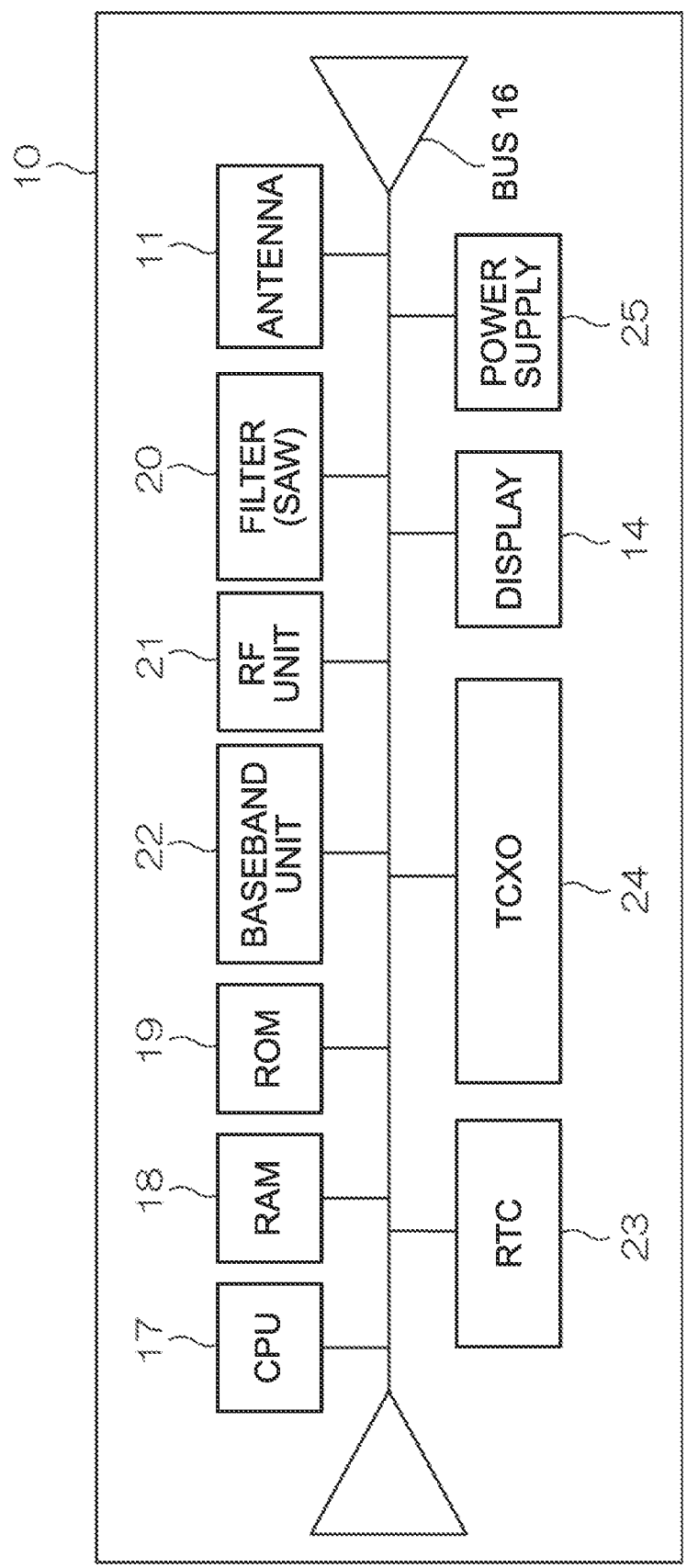
FIG. 2 is a block diagram showing the internal hardware configuration of the GPS wristwatch shown in FIG. 1.

FIG. 1 is a schematic diagram of a timepiece having a time correction device according to the present invention, which in this embodiment of the invention is described as a wristwatch 10 with a GPS time correction device (referred to below as a GPS wristwatch 10). FIG. 2 is a block diagram showing the internal hardware configuration of the GPS wristwatch 10 shown in FIG. 1.

As shown in FIG. 1 this GPS wristwatch 10 has a dial 12 with long and short hands 13 on the front, and a display 14 such as an LED module for displaying information. The display 14 could alternatively be an LCD module or analog dial instead of an LED module.

As shown in FIG. 1 the GPS wristwatch 10 has an antenna 11, and the antenna 11 is used to receive signals from GPS satellites 15a to 15d orbiting the Earth on specific orbits. These GPS satellites 15a to 15d are simply one example of positioning system satellites that orbit the Earth.

As shown in FIG. 2 the GPS wristwatch 10 has an internal timekeeping unit and a GPS unit, and is arranged to function as a computer.

More specifically, the timekeeping unit in this embodiment of the invention renders an electronic timepiece.

The arrangement shown in FIG. 2 is further described below.

As shown in FIG. 2 the GPS wristwatch 10 has a bus 16 to which are connected a CPU 17, RAM 18, ROM 19, and other devices.

Also connected to the bus 16 is a positioning unit for determining its own position, which in this aspect of the invention is a GPS receiver by way of example. More specifically, the antenna 11, a filter (SAW) 20, RF unit 21, and baseband unit 22 are connected to the bus 16.

Signals received from the GPS satellites 15a to 15d shown in FIG. 1 are thus passed from the antenna 11 through the filter (SAW) 20 and RF unit 21 and extracted by the baseband unit 22 as the GPS signal.

The signals received from the GPS satellites 15a to 15d are described in further detail below.

A timekeeping unit is also connected to the bus 16. More specifically, a real-time clock (RTC) 23 rendered as an IC device, and a temperature-compensated crystal oscillator (TCXO) 24 are connected as the timekeeping unit.

A power supply 25 such as a battery is also connected to the bus 16. This power supply 25 is the power source for driving the timekeeping unit and for driving the GPS unit.

The display 14 shown in FIG. 1 is also connected to the bus 16.

The bus 16 is thus an internal bus with the addresses and data paths needed to connect all of the other requisite devices.

The RAM 18 is working memory used by the CPU 17 to execute programs and control the ROM 19 and other devices connected to the bus 16. The ROM 19 stores the programs and other data.

The real-time clock (RTC) 23 is an example of a time information generating unit for generating time information, and the GPS unit is an example of a reception unit for receiving satellite signals transmitted from positioning information satellites (such as GPS satellites 15a).

Figure 3:
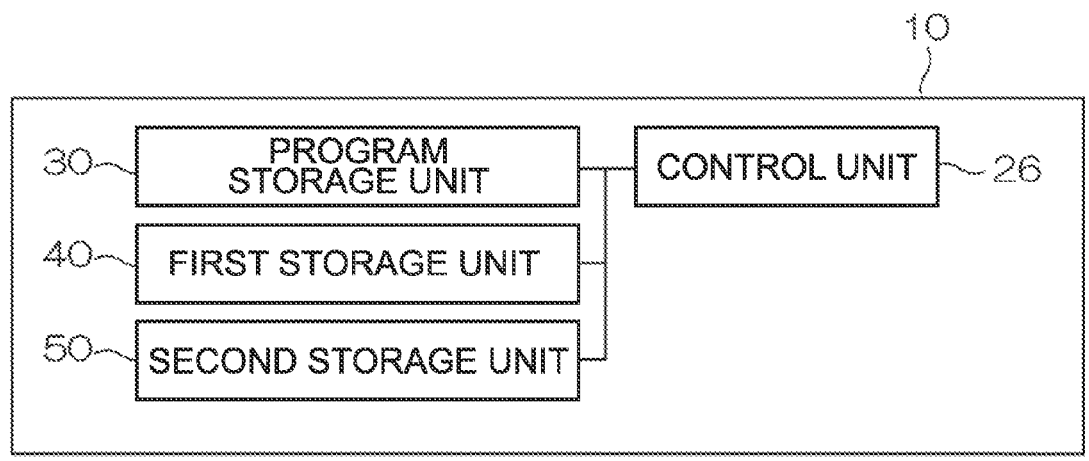
FIG. 3 is a block diagram showing the basic software arrangement of the GPS wristwatch of the invention.

FIG. 3 to FIG. 6 are block diagrams showing the basic software structure of the GPS wristwatch 10, FIG. 3 being an overview.

As shown in FIG. 3 the GPS wristwatch 10 has a control unit 26. The control unit 26 runs the programs stored in the program storage unit 30 shown in FIG. 3, and processes data stored in the first storage unit 40 and data stored in the second storage unit 50.

The program storage unit 30, the first storage unit 40, and the second storage unit 50 are shown as discrete entities in FIG. 3, but the data does not need to be stored in separate devices and is shown this way for descriptive convenience only.

Furthermore, the data stored in the first storage unit 40 shown in FIG. 3 is primarily data that is stored in advance of program execution, and the data that is stored in the second storage unit 50 is the data resulting from processing the data in the first storage unit 40 by running a program stored in the program storage unit 30.

Figure 4:
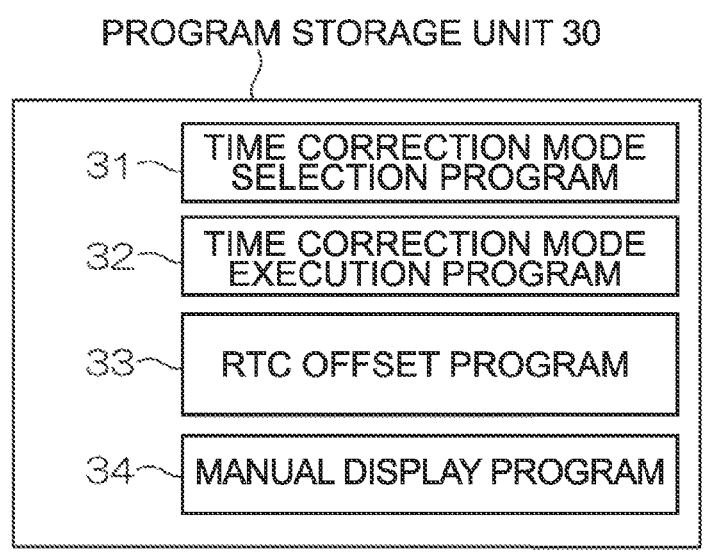
FIG. 4 is a block diagram of the data stored in the program storage unit shown in FIG. 3.
Figure 5:
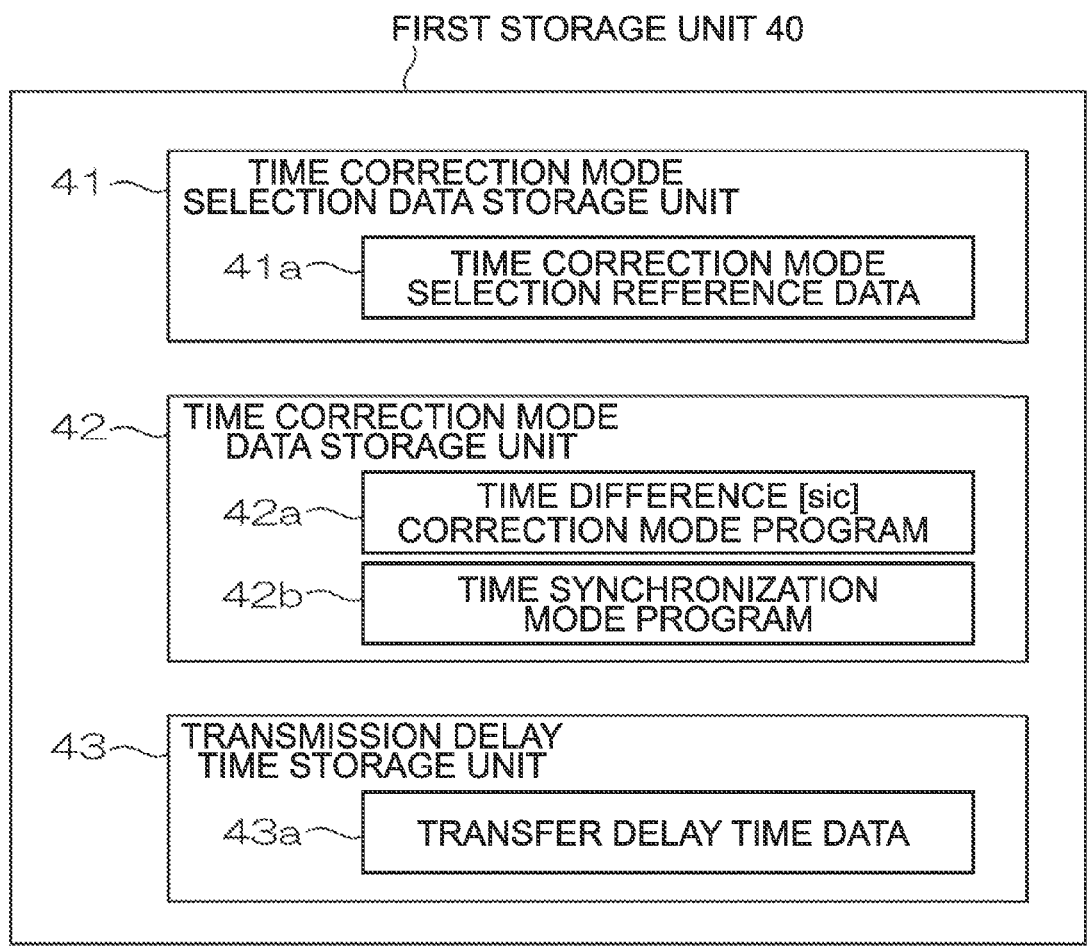
FIG. 5 is a block diagram of the data stored in the first storage unit shown in FIG. 3.
Figure 6:
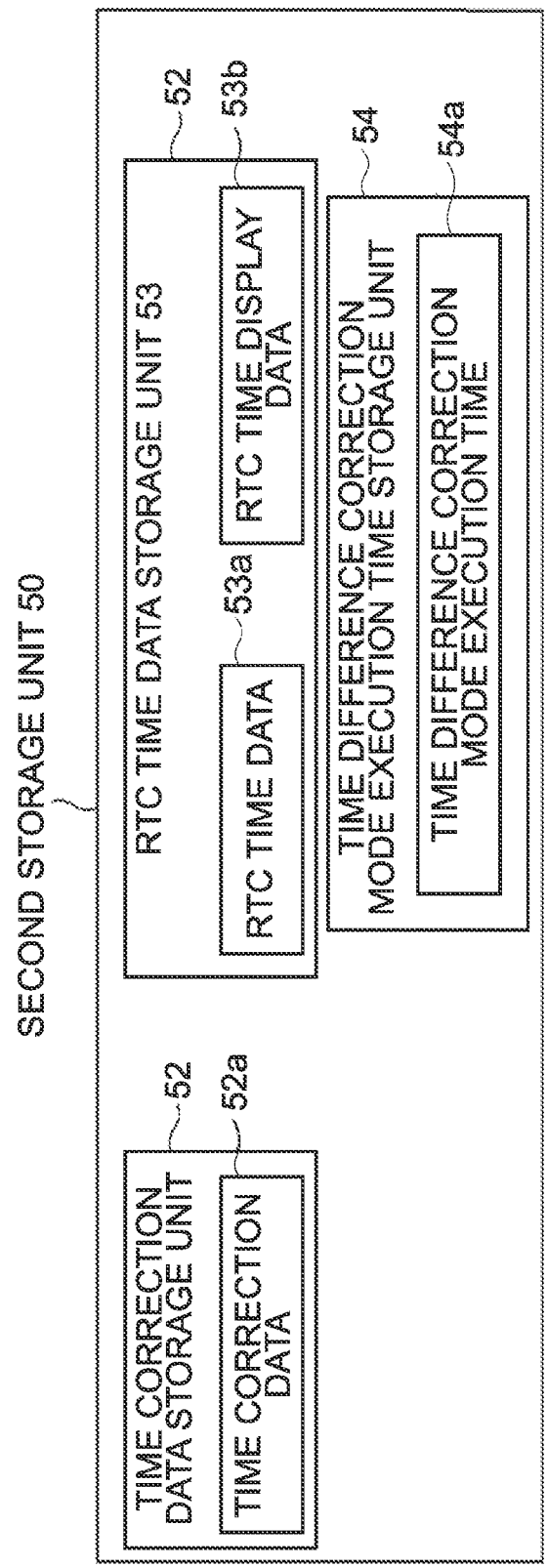
FIG. 6 is a block diagram of the data stored in the second storage unit shown in FIG. 3.

FIG. 4 is a block diagram of the data stored in the program storage unit 30 shown in FIG. 3, FIG. 5 is a block diagram of the data stored in the first storage unit 40 shown in FIG. 3, and FIG. 6 is a block diagram of the data stored in the second storage unit 50 shown in FIG. 3.

Figure 7:
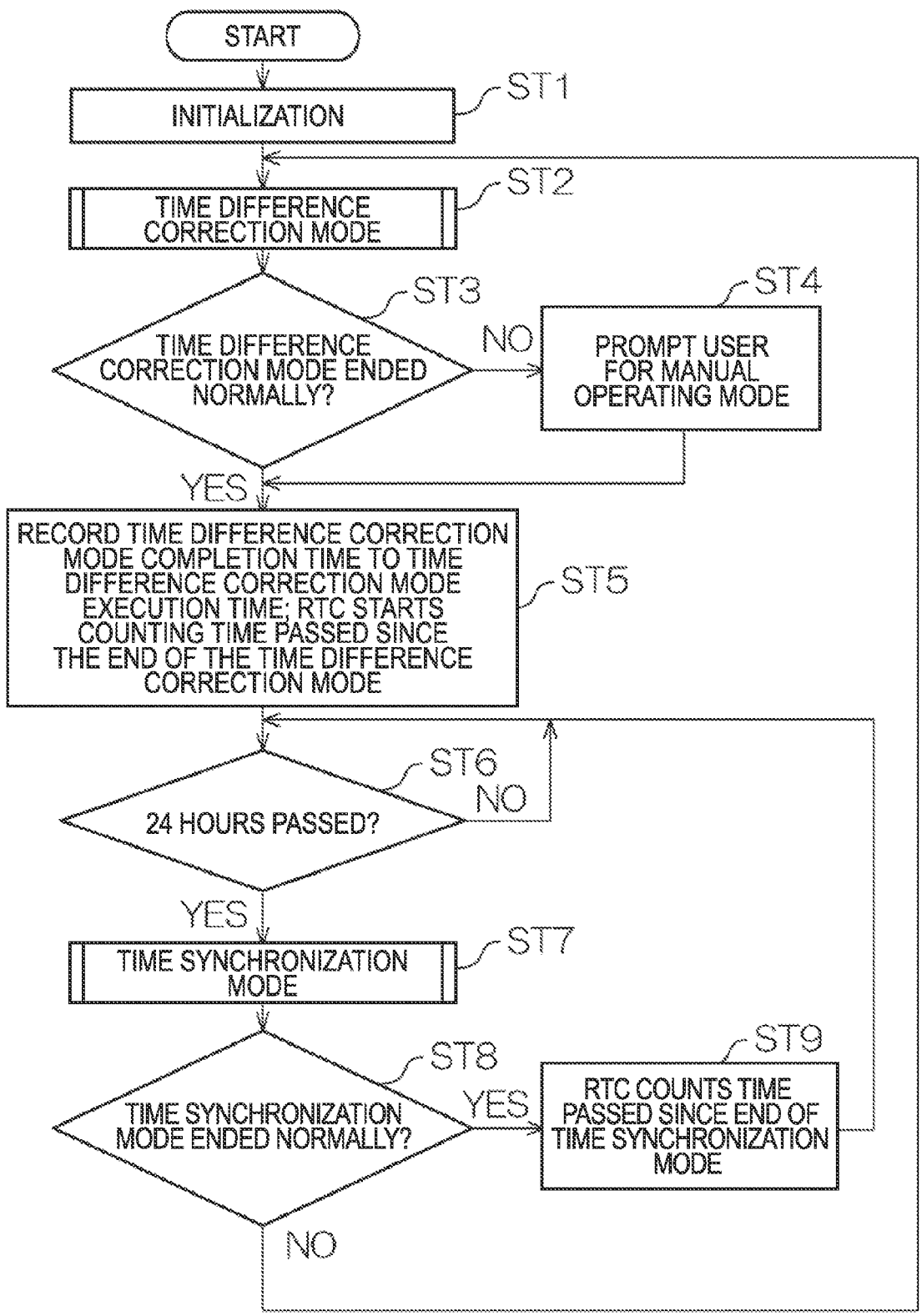
FIG. 7 is a flow chart describing the operation of the GPS wristwatch according to a preferred embodiment of the invention.
Figure 8:
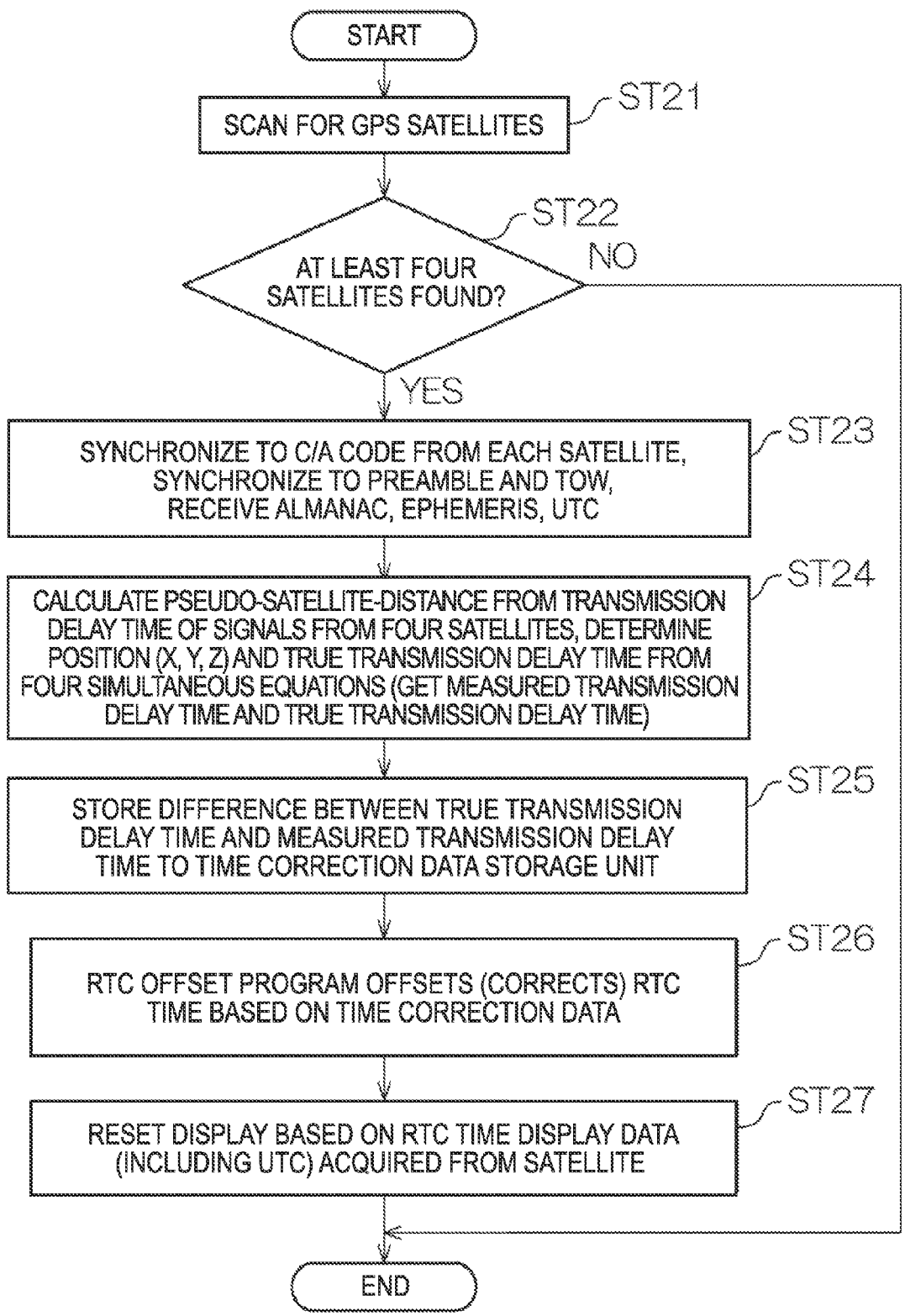
FIG. 8 is a flow chart of the time difference correction mode executed in step ST2 in FIG. 7.
Figure 9:
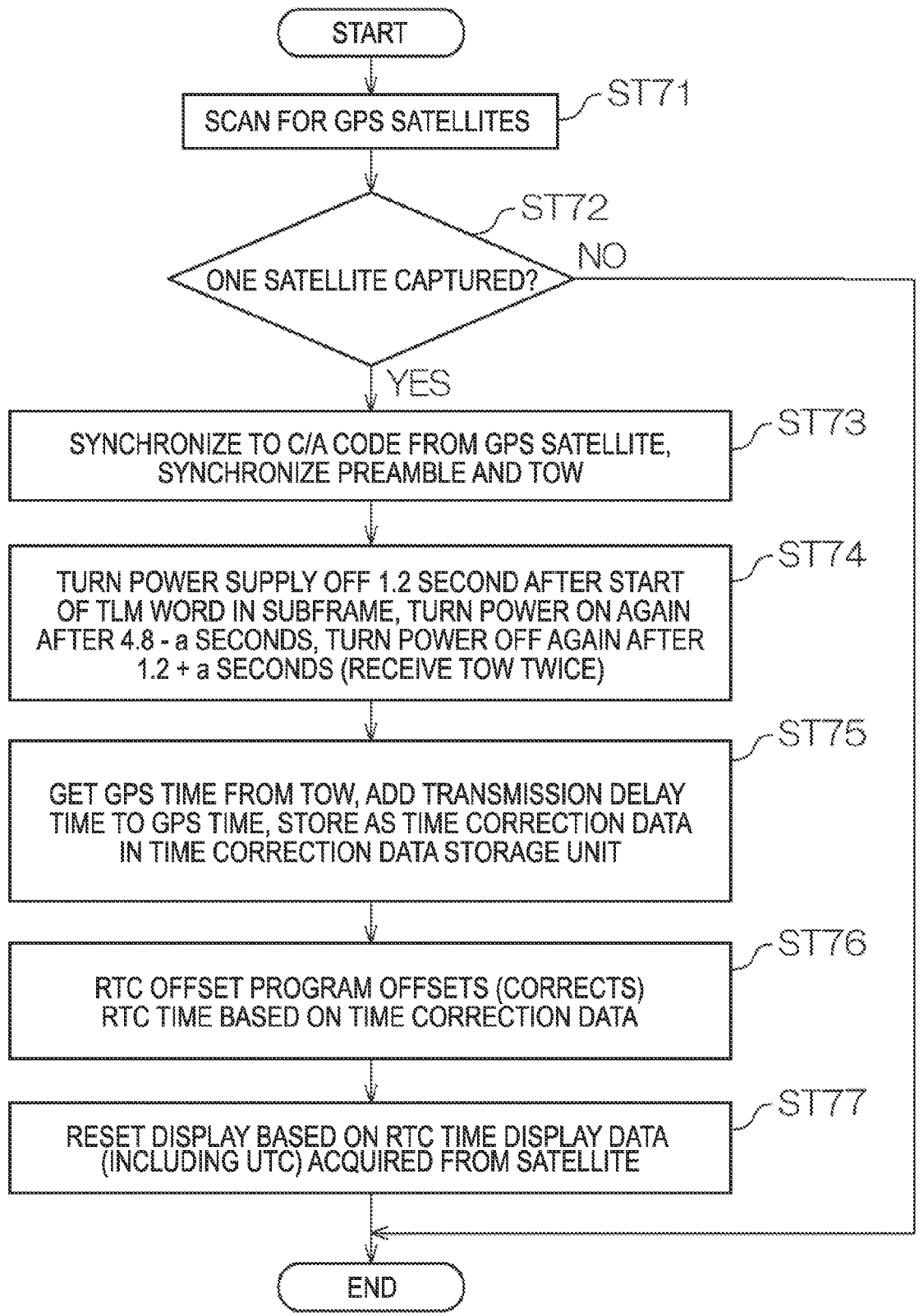
FIG. 9 is a flow chart of the time synchronization mode executed in step ST7 in FIG. 7.

FIG. 7 to FIG. 9 are flow charts describing the main operation of the GPS wristwatch 10 according to this embodiment of the invention.

The programs and data shown in FIG. 4 to FIG. 6 are described next while describing the operation of the GPS wristwatch 10 according to this embodiment of the invention with reference to the flow charts in FIG. 7 to FIG. 9.

In order to set the time of the internal timekeeping unit, that is, the real-time clock (RTC) 23, of the GPS wristwatch 10 shown in FIG. 1, the user causes the GPS wristwatch 10 to run the initialization step ST 1 shown in FIG. 7.

This causes the time correction mode selection program 31 shown in FIG. 4 to run. The time correction mode selection program 31 references the time correction mode selection reference data 41a that is stored in the time correction mode selection data storage unit 41 shown in FIG. 5 to select data in the time correction mode data storage unit 42 in FIG. 5.

More specifically, the time correction mode selection reference data 41a in FIG. 5 is data for selecting the time difference correction mode program 42a described below when the real-time clock (RTC) 23 is in the initialization state, that is, when signals from a GPS satellite 15a cannot be captured, and selecting the time synchronization mode program 42b described below when a GPS satellite 15a can be captured.

In step ST1 the real-time clock (RTC) 23 is initialized and a GPS satellite 15a signal cannot be captured, and the time correction mode selection program 31 therefore selects the time difference correction mode program 42a in FIG. 5. Based on the result returned by the time correction mode selection program 31, the time correction mode execution program 32 in FIG. 4 then processes the selected time difference correction mode program 42a.

Control then goes to step ST2 in FIG. 7. Step ST2 runs the time difference correction mode program 42a.

FIG. 8 is a flow chart of the time difference correction mode in step ST2 in FIG. 7.

The time difference correction mode is described below with reference to FIG. 8.

The time difference correction mode starts by scanning for a GPS satellite 15a signal in step ST21 in FIG. 8. More specifically, the GPS unit shown in FIG. 2 operates to receive a GPS signal through the antenna 11 and determine if there are GPS satellites 15a from which signals can be captured.

Step S22 then determines if signals can be captured from at least four GPS satellites 15a. If step ST22 returns Yes, control goes to step ST23. If step ST22 returns No, the GPS wristwatch 10 must be located where GPS satellites 15a signals cannot be received and the time correction mode aborts.

Signals from the captured GPS satellites 15a are then received in step ST23. The signals transmitted from the GPS satellites 15a are described below. FIG. 10 describes the format of the GPS signal.

As shown in FIG. 10A, each GPS satellite 15a transmits signals in data frame units and transmits one frame every 30 seconds. Each frame consists of five subframes, and one subframe is transmitted every 6 seconds. Each subframe contains 10 words (1 word is transmitted every 0.6 second).

The first word in each subframe is a telemetry (TLM) word, and each TLM word starts with a preamble as shown in FIG. 10B.

The TLM word is followed by a handover word HOW, and each HOW starts with the time of week TOW indicating the GPS time information of the GPS satellite.

The GPS time is the number of seconds since 00:00:00 Sunday night, and is reset to zero at precisely 00:00:00 every Sunday night. The same GPS week number is added to the GPS time throughout the week, and the GPS receiver can therefore get the precise GPS time by reading the week number and the elapsed time (number of seconds). The GPS time is referenced to the Coordinated Universal Time (UTC).

The receiver must synchronize with the signal from the GPS satellite 15a in order to receive the frame data from a particular GPS satellite 15a, and the C/A code is used for synchronization with 1 ms precision. The C/A code is a 1023-chip pseudo random noise code that repeats every 1 ms.

To use these signals transmitted from the GPS satellites 15a, this embodiment of the invention is phase synchronized with the C/A code from each selected GPS satellite 15a and synchronized with the preamble of the TLM word and the TOW in the HOW word shown in FIG. 10B in step ST23 in FIG. 8. The data in each subframe is then decoded to acquire, for example, the ephemeris (precise orbital information for a particular GPS satellite 15a), the almanac (orbital information for all GPS satellites 15a) and the UTC as shown in FIG. 10A.

The frame and subframes shown in FIG. 10 show an example of a specific unit of a satellite signal in which the TOW is an example of the time information of a positioning information satellite (such as a GPS satellite 15a) and the TLM and HOW words are examples of time-related information units. The words storing the ephemeris and almanac data are examples of satellite information units containing satellite information other than time related information.

In step ST24 the GPS wristwatch 10 gets the ephemeris of the four GPS satellites 15a, measures the transmission delay time of the signals from each of the GPS satellites 15a (the time it took the signals to travel from the GPS satellite to the GPS wristwatch 10) using the internal RTC 23, and based on the speed of light calculates the pseudo-satellite-distance between the GPS wristwatch 10 and the GPS satellites 15a.

Based on this pseudo-satellite-distance to each of the four selected GPS satellites 15a, the position (X, Y) and altitude (Z) of the GPS wristwatch 10, and the true transmission delay time (T) are calculated in four simultaneous equations to determine the position and altitude (X, Y, Z) of the GPS wristwatch 10, the time difference, and the true transmission delay time (T).

Step ST24 thus determines the true transmission delay time and the transmission delay time measured by the real-time clock (RTC) 23.

The time difference correction mode program 42a is thus arranged to acquire the transmission delay time that is measured by the RTC 23, and the position of the GPS wristwatch 10 and the true transmission delay time, which are calculated based on the transmission delay time that is the actually measured signal transmission delay time of the signals from each of the four GPS satellites 15a.

Control then goes to step ST25. The difference between the true transmission delay time calculated in step ST24 and the transmission delay time measured by the RTC 23 is then stored in the time correction data storage unit 52 as time correction data 52a.

The RTC offset program 33 shown in FIG. 4 then runs in step ST26 to offset (correct) the RTC time data 53a in the RTC time data storage unit 53 based on the time correction data 52a shown in FIG. 6.

The time correction data storage unit 52 is an example of a time correction information storage unit for storing the time correction information (time correction data 52a) for correcting the time information (RTC time data 53a) of the time information generating unit.

The RTC offset program 33 is an example of a time information correction unit for correcting the time information (RTC time data 53a) based on the time correction information (the time correction data 52a in FIG. 6).

The time displayed on the dial 12 is then corrected based on the RTC time display data 53b shown in FIG. 6, which also contains the UTC information acquired from the GPS satellites 15a.

The displayed time is therefore corrected to account for the time difference so that, for example, the local time in Japan is displayed.

The time difference correction mode then ends. Because the time difference correction mode corrects the RTC time data 53a of the real-time clock (RTC) 23 in the GPS wristwatch 10 using time information transmitted from GPS satellites 15a that have an on-board atomic clock, the time kept by the GPS wristwatch 10 can be corrected with extremely high precision.

The time difference correction mode program 42a shown in FIG. 5 is an example of plural positioning-information-satellite-referenced time information that is used by the reception unit (GPS receiver) for positioning and generating time correction information (time correction data 52a) based on satellite signals from a plurality of (4 in this example) positioning information satellites (such as the GPS satellites 15a).

This completes step ST2 in FIG. 7.

In step ST3 the time correction mode execution program 32 determines if the time difference correction mode program 42a terminated normally. If it did not end normally, step ST4 displays a prompt asking the user to set the time manually.

More specifically, the manual display program 34 shown in FIG. 4 executes to display a prompt instructing the user to manually set the time on the display 14 shown in FIG. 1 and FIG. 2.

Control then goes to step ST5. In step ST5 the time correction mode execution program 32 stores the time at which execution of the time difference correction mode program 42a ended as the time difference correction mode execution time 54a in the time difference correction mode execution time storage unit 54.

The time correction mode execution program 32 then causes the real-time clock (RTC) 23 to count the time elapsed after the time difference correction mode program 42a ended.

The time correction mode selection program 31 in FIG. 4 also runs to reference the time correction mode selection reference data 41a in FIG. 5. The time correction mode selection reference data 41a indicates that the time synchronization mode program 42b shown in FIG. 5 is to execute 24 hours after the time difference correction mode program 42a ends.

The time correction mode selection program 31 therefore determines in step ST6 whether 24 hours have passed, and control goes to step ST7 if 24 hours have passed.

Based on the time synchronization mode program 42b stored in the time correction mode data storage unit 42 in FIG. 5, the time correction mode execution program 32 in FIG. 4 executes the time synchronization mode in step ST7.

FIG. 9 is a flow chart of the time synchronization mode executed as step ST7 in FIG. 7.

The content of the time synchronization mode program 42b is described below with reference to FIG. 9.

In step ST71 the GPS unit in FIG. 2 operates to scan for a GPS satellite 15a, and step ST72 determines if one or more GPS satellites 15a was located. If step ST72 returns Yes, step ST73 synchronizes with the C/A code received from the located GPS satellites 15a, and synchronizes with the preamble and TOW shown in FIG. 10B.

Step ST74 executes next. FIG. 11 schematically describes the operation of step ST74. FIG. 11A shows the C/A code, FIG. 11B shows the word data in FIG. 10, and FIG. 11C shows the power supply 25 sequence relative to each other on the same time base.

The GPS unit of the GPS wristwatch 10 first receives the first subframe A shown in FIG. 10A, and using the TLM words (A) gets the TOW (FIG. 10B) from the HOW.

As described above the TOW is the GPS time information of interest in this embodiment of the invention, and the object of the time synchronization mode is to acquire the GPS time information from the GPS satellite 15a signals.

Said in another way, it is not necessary to get any GPS signal information other than the TOW, and specifically does not need to acquire the ephemeris and almanac data shown in FIG. 10A. As shown in FIG. 10A, however, the subframes are sequentially transmitted from the first subframe (A) to the fifth subframe (E), and each subframe is transmitted sequentially from the TLM to the last word of the ephemeris, for example.

In order for the GPS unit to acquire only the TOW data that is stored in the HOW of each subframe, the TOW data in the HOW of the second subframe cannot be acquired without receiving the satellite correction data stored in the first subframe after getting the TOW data in the HOW of the first subframe (A) in FIG. 10A.

This means that the GPS unit of the GPS wristwatch 10 must continuously receive data and power consumption is thus great.

This embodiment of the invention solves this problem by entering a sleep mode that reduces the power supply from the power supply 25 for the satellite signal reception operation of the GPS unit after the HOW data in the first subframe is received until the TLM word (B) in the second subframe is received.

This control method eliminates unnecessary operation of the GPS unit and reduces power consumption.

More specifically, the GPS unit has already synchronized with the C/A code in FIG. 11A in step ST73, and is therefore synchronized with the starting position of the TLM word (A) in the first subframe as shown in FIG. 11B. The TOW data in the HOW that follows the TLM word (A) can therefore be acquired.

As described above, 0.6 second is required to receive one word. The GPS unit therefore counts 1.2 seconds from the start of TLM word (A) using the RTC 23, and then reduces the power supply from the power supply 25 to a sleep mode to as shown in FIG. 11C. Satellite signal reception therefore stops, but the essential TOW data has already been received.

Furthermore, because one subframe is 10 words long as described above, the power supply 25 remains in the sleep mode for the next 8 words or 4.8 seconds. Power supply from the power supply 25 is then increased to enable the reception mode as shown in FIG. 11C to get the TLM and HOW data from the second subframe (B) as shown in FIG. 10A.

The sleep mode is again resumed after another 1.2 seconds, thereby acquiring the second TOW data and reducing power consumption.

These times of 1.2 seconds and 4.8 seconds are the theoretical values, and there is actually some deviation in the operation of the RTC 23, for example. As shown in step ST74, the actual reception mode is therefore held for this 1.2 second reception time plus an estimated deviation time of α-seconds. The sleep mode is also shortened to the theoretical 4.8 second period minus the estimated deviation time of α-seconds.

This embodiment of the invention acquires the same TOW data twice for verification, but the TOW data could be received only once or three or more times.

Control then goes to step ST75.

Step ST75 gets the GPS time from the received TOW shown in FIG. 10B. However, because this mode does not receive the ephemeris data, for example, the position of the GPS satellite is unknown and the transmission delay time, which is the time required for the satellite signal from the GPS satellite 15a to reach the GPS wristwatch 10, cannot be calculated.

This embodiment of the invention therefore stores the transfer delay time data 43a shown in FIG. 5 to the transmission delay time storage unit 43.

The transfer delay time data 43a is 80 ms in this example. This is calculated from the difference between the distance of roughly 20,600 km from the GPS wristwatch 10 to the GPS satellite 15a at its apex (directly overhead) and the distance of roughly 26,000 km to the GPS satellite 15a at its farthest point over the horizon.

The transmission delay time when the satellite is directly overhead is therefore 70 ms and is 90 ms when at the horizon, and the median is therefore 80 ms with a precision of ±10 ms.

When the GPS unit is not operating in the positioning mode, precision of less than 50 ms is normally sufficient for correcting the time as in this embodiment of the invention, and precision of 10 ms as in this embodiment is therefore extremely high.

In step ST75 the time correction mode execution program 32 adds the transfer delay time data 43a of 80 ms to the GPS time denoted by the TOW, and stores the result as the time correction data 52a in the time correction data storage unit 52.

Control then goes to step ST76. In step ST76 the RTC offset program 33 shown in FIG. 4 runs to correct the RTC time data 53a based on the time correction data 52a in FIG. 6.

In step ST77 the dial 12 is then corrected based on the RTC time display data 53b in FIG. 6.

This completes the time synchronization mode program 42b.

As described above, the time synchronization mode program 42b captures a signal from only one GPS satellite 15a, reads the TOW value from the satellite signal from the GPS satellite 15a, and does not need to receive the ephemeris and other GPS data.

The time synchronization mode program 42b therefore consumes significantly less power than the time difference correction mode program 42a.

The time synchronization mode program 42b also adds high precision transfer delay time data 43a to the acquired TOW value of the GPS time to generate the time correction data 52a of the RTC 23, and therefore enables correcting the RTC 23 with high precision.

Note that the time correction data 52a in FIG. 6 is an example of time correction information, and this time correction data 52a is generated based on the TOW or other time related information.

In addition, step ST74 in FIG. 9 is an example of an arrangement in which the reception unit (GPS unit) is driven to receive the satellite signal while the reception unit (GPS unit) is receiving the time related information unit (TLM and HOW), and the reception unit (GPS unit) is not driven to receive the satellite signal while the other satellite information (such as the ephemeris) is received.

The time synchronization mode program 42b is an example of single positioning-information-satellite-referenced time correction information for generating the time correction information (time correction data 52a) based on satellite signals received by the reception unit (GPS unit) from one positioning satellite (such as GPS satellite 15a).

The time correction mode selection reference data 41a is an example of selection information used by the reception unit (GPS unit) for selecting the single positioning-information-satellite-referenced time information time difference correction mode program 42a or the plural positioning-information-satellite-referenced time information (time synchronization mode program 42b, based on capturability information about whether or not signals from a positioning information satellite (such as GPS satellite 15a) can be captured.

The time correction mode selection program 31 and the time correction mode execution program 32 are an example of a time correction selection execution unit for selecting the single positioning-information-satellite-referenced time information (time synchronization mode program 42b) or the plural positioning-information-satellite-referenced time information (time difference correction mode program 42a), based on the selection information (time correction mode selection reference data 41a).

Next, step ST8 in FIG. 7 determines based on the time synchronization mode program 42b whether step ST7 ended normally. If not, the time difference correction mode is run again in step ST2 as shown in FIG. 7. This enables correcting the time with high precision.

If step ST8 determines that the time synchronization mode program 42b executed normally, control goes to step ST9.

In step ST9 the RTC 23 measures the time since the end of the time correction mode, and control then goes to step ST6. The time synchronization mode program 42b thus runs every 24 hours to correct the time kept by the RTC 23.

Because power consumption by the time synchronization mode program 42b is low, power consumption is not great even if the RTC 23 is corrected every 24 hours, and this arrangement is therefore desirable for a GPS wristwatch 10 that has a very small power supply.

This embodiment of the invention uses very little power to correct the time kept by the RTC 23 with high precision, and thus affords a highly reliable GPS wristwatch 10.

Furthermore, because the time difference correction mode program 42a is run instead of the time synchronization mode program 42b when signals from a GPS satellite 15a cannot be captured, the GPS wristwatch 10 can always correct the time with high precision.

This embodiment of the invention starts with the time difference correction mode program 42a as shown in FIG. 7 because operation is assumed to start from the initialization mode.

However, if the GPS wristwatch 10 can capture signals from a GPS satellite 15a from the beginning, the time synchronization mode program 42b can run first. If capturing GPS satellite 15a later becomes difficult, the time difference correction mode program 42a could run.

Embodiment 2

Figure 12:
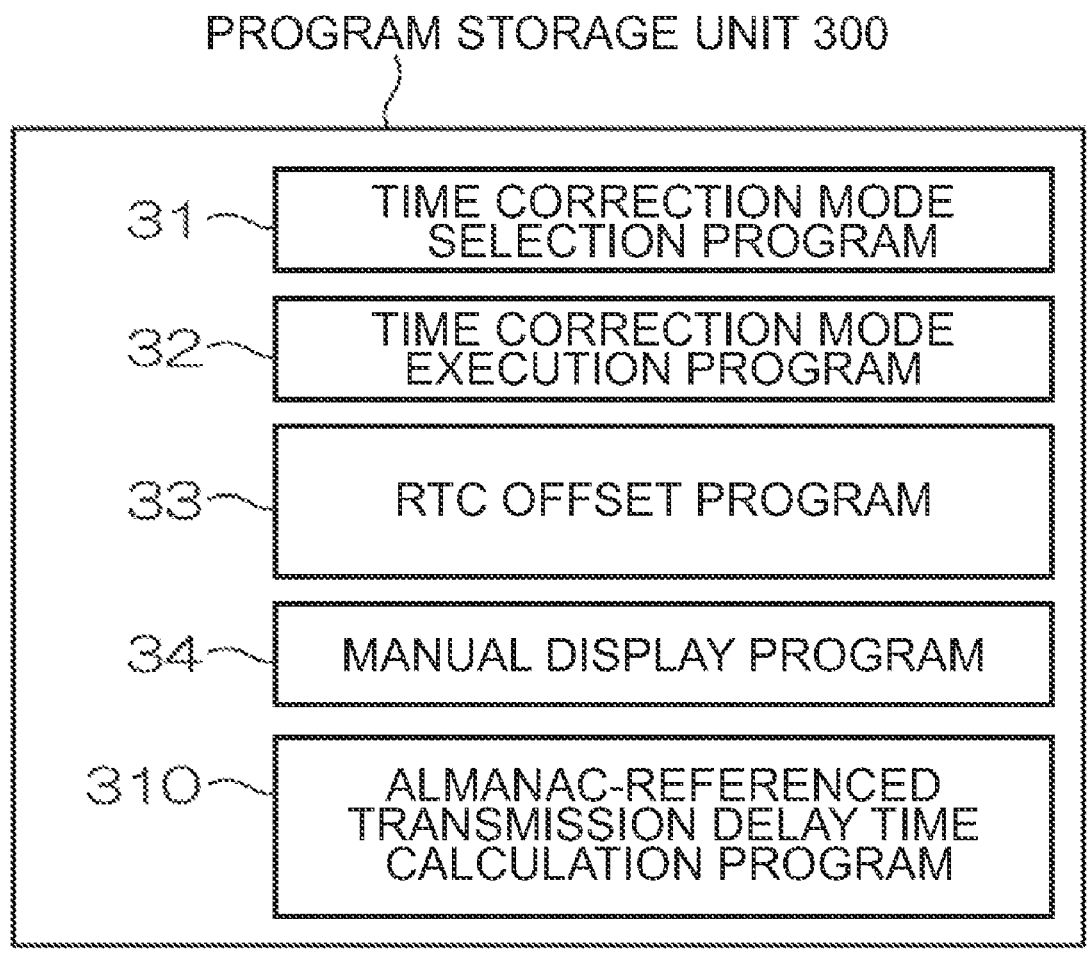
FIG. 12 is a block diagram of the software arrangement of a GPS wristwatch according to a second embodiment of the invention.
Figure 13:
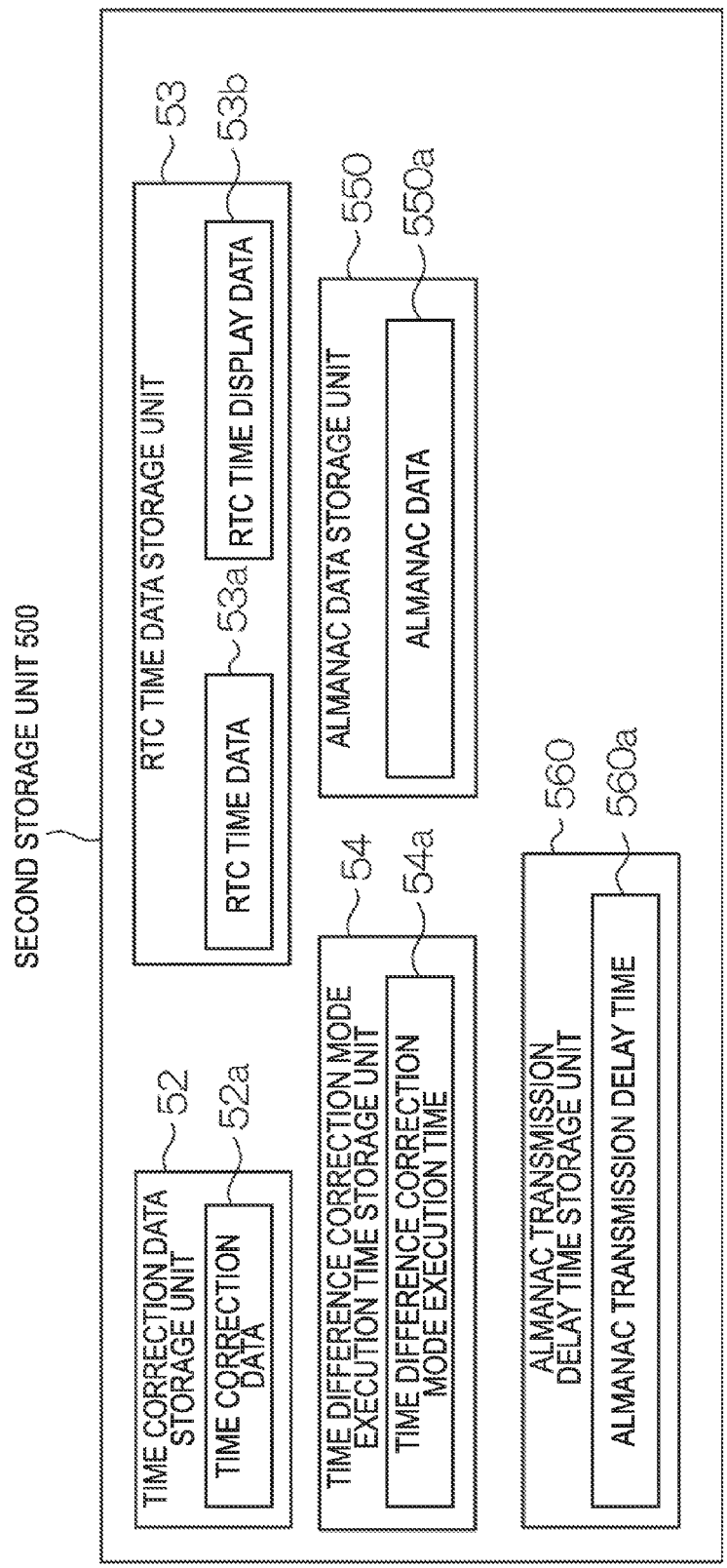
FIG. 13 is another block diagram of the software arrangement of a GPS wristwatch according to a second embodiment of the invention.
Figure 14:
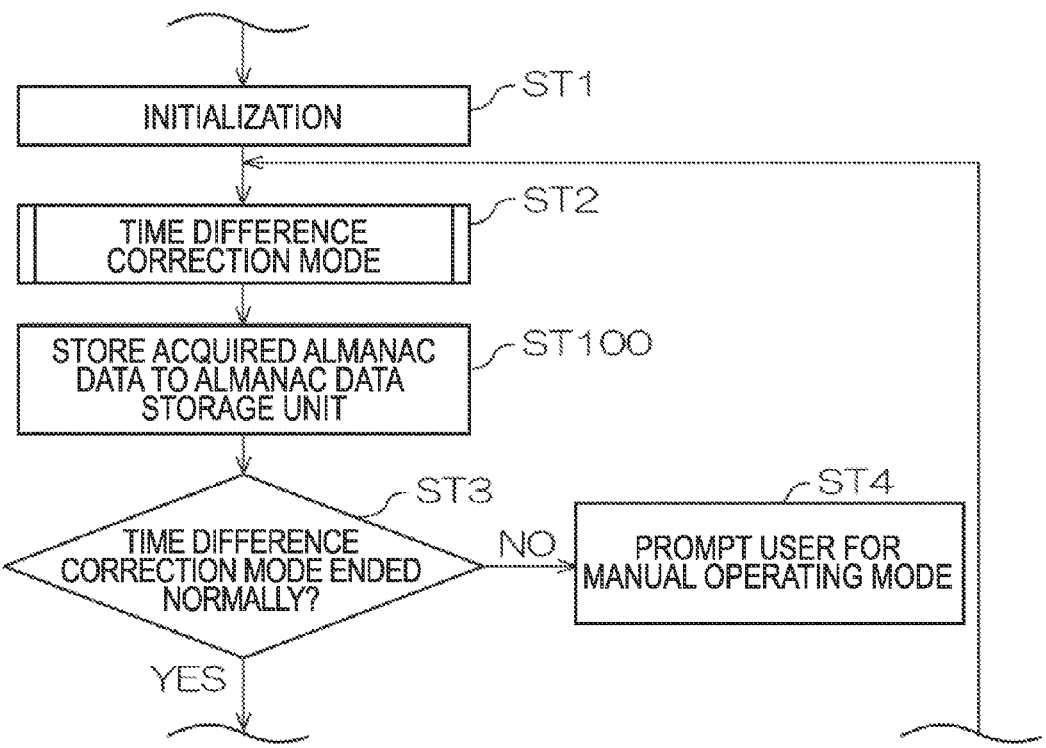
FIG. 14 is a flow chart of the main steps in the operation of the GPS wristwatch according to the second embodiment of the invention.
Figure 15:
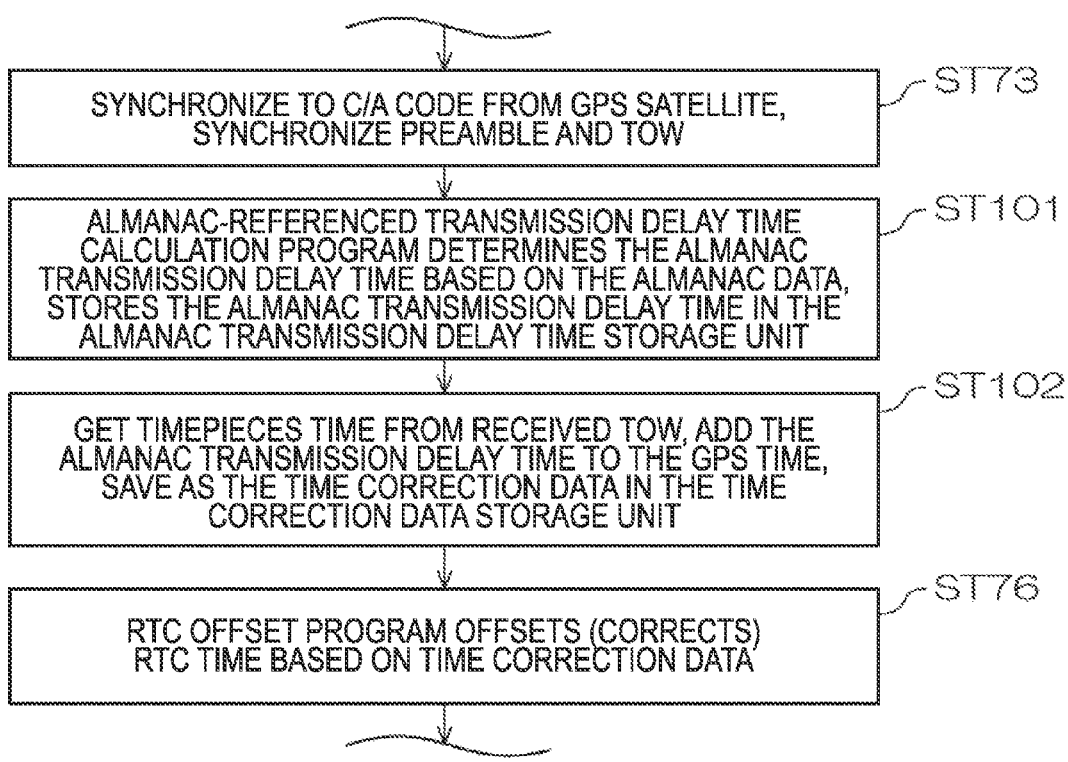
FIG. 15 is another flow chart of the main steps in the operation of the GPS wristwatch according to the second embodiment of the invention.

FIG. 12 and FIG. 13 are block diagrams showing the software arrangement of a GPS wristwatch according to a second embodiment of the invention, and FIG. 14 and FIG. 15 are flow charts of the main steps in the operation of the GPS wristwatch according to the second embodiment of the invention.

The arrangement of this second embodiment is substantially the same as the first embodiment of the invention described above. Like parts are therefore identified by like reference numerals and the differences to the first embodiment are described below.

As shown in FIG. 5, the transfer delay time data 43a of 80 ms is stored by default in the first embodiment of the invention, and this transfer delay time data 43a is added to the GPS time (TOW) received from the GPS satellite 15a in step ST75 in FIG. 9 to get the time correction data 52a.

As described above, however, the transmission delay time differs according to the location of the GPS satellite 15a, such as directly overhead or at the horizon.

This embodiment of the invention therefore determines the angle of elevation of the GPS satellite 15a based on the almanac data (information about the orbits of all GPS satellites 15a in the constellation), and calculates the accurate transmission delay time based on this angle of elevation.

This is described more specifically below. FIG. 14 is a flow chart showing the differences between the operation of the first embodiment shown in FIG. 7 and this embodiment. After the time difference correction mode in FIG. 7, this embodiment of the invention stores the acquired almanac data to the almanac data storage unit in step ST100 as shown in FIG. 14.

As shown in FIG. 13, the second storage unit 500 therefore also has an almanac data storage unit 550 for storing almanac data.

The almanac data is carried in subframe 4 and subframe 5 as shown in FIGS. 10, and 25 subframes must be received in order to acquire all of the almanac data.

As a result, as shown in FIG. 14, the GPS wristwatch 10 does not newly acquire all of the almanac data from the GPS satellite 15a, and instead can store the almanac data for all of the GPS satellites 15a in the almanac data storage unit 550 shown in FIG. 13.

The almanac data thus acquired is processed as described below. FIG. 15 is a flow chart showing the differences to the operation of the first embodiment shown in FIG. 9.

As shown in FIG. 15 step ST101 executes after step ST73 in FIG. 9. That is, the almanac-referenced transmission delay time calculation program 310 in FIG. 12 determines the almanac transmission delay time 560a based on the almanac data 550a in FIG. 13 and stores the almanac transmission delay time 560a in the almanac transmission delay time storage unit 560 in FIG. 13.

More specifically, the almanac-referenced transmission delay time calculation program 310 determines the position, that is, the elevation angle, of the GPS satellite 15a captured by the GPS wristwatch 10 based on the almanac data 550a. The almanac-referenced transmission delay time calculation program 310 then references table data not shown that describes the relationship between the elevation angle and the transmission delay time to the GPS wristwatch 10 to determine the almanac transmission delay time 560a.

Then, as shown in step ST102 in FIG. 15, the time correction mode execution program 32 adds the almanac transmission delay time 560a to the GPS time to get the time correction data 52a and correct the RTC 23 as shown in step ST76.

This aspect of the invention can correct the time with even greater precision because it can accurately determine the transmission delay time to the GPS wristwatch 10 of the satellite signals transmitted from the GPS satellite 15a.

The almanac data 550a is an example of the orbital information for the positioning information satellites (such as GPS satellites 15a).

The almanac-referenced transmission delay time calculation program 310 is an example of an almanac-referenced transmission delay time calculation unit that determines the almanac-referenced transmission delay time based on the orbital information (almanac data 550a).

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A time correction device comprising:
a reception unit that receives satellite signals transmitted from at least one positioning information satellite orbiting the Earth;
a time correction information storage unit that stores time correction information for correcting time information produced by a time information generating unit;
a time information correction unit for correcting the time information;
single positioning-information-satellite-referenced time correction information used by the reception unit to generate first time correction information based on the satellite signal from a single positioning information satellite; and
plural positioning-information-satellite-referenced time correction information used by the reception unit for positioning and to generate second time correction information based on satellite signals from a plurality of positioning information satellites;
wherein the received satellite signals contain only telemetry (TLM) data followed by handover word (HOW) data;
the time correction device further contains transmission delay time information denoting the time until a particular satellite signal transmitted from the at least one positioning information satellite can be received;
the time correction information is generated based on the received TLM and HOW data and the transmission delay time information; and
the reception unit enters a sleep mode from immediately after receiving the HOW data in a first subframe until receiving the TLM data in a second subframe; and
wherein the reception unit has
selection information for selecting the first time correction information or the second time correction information based on capturability information denoting whether a satellite signal from the positioning information satellites can be captured, and
a time correction selection and execution unit for selecting the first time correction information or the second time correction information based on the selection information and correcting the time based on the selected time correction information.

2. A timepiece, comprising:
a time correction device as recited in claim 1.

3. A time correction method comprising:
receiving satellite signals transmitted from positioning information satellites orbiting the Earth using a reception unit;
generating first time correction information from single positioning-information-satellite-referenced time correction information based on a satellite signal from one of the positioning information satellites;
generating second time correction information from plural positioning-information-satellite-referenced time correction information based on satellite signals from a plurality of the positioning information satellites;
storing first and second time correction information;
selecting the first or the second time correction information based on selection information and the capturability of the satellite signals;
correcting the time information based on the selected first or second time correction information;
storing orbital information about the positioning information satellites; and
determining an almanac-referenced transmission delay time based on the orbital information;
wherein the received satellite signals contain only telemetry (TLM) data followed by handover word (HOW) data;
the time correction information is generated based on the received TLM and HOW data and the transmission delay time information; and
the reception unit enters a sleep mode from immediately after receiving the HOW data in a first subframe until receiving the TLM data in a second subframe.

* * * * *